H. SEVERIN.
APPARATUS FOR MANUFACTURING HOLLOW GLASS ARTICLES, SUCH AS BOTTLES.
APPLICATION FILED MAR. 28, 1907.

901,199.

Patented Oct. 13, 1908.

2 SHEETS—SHEET 1.

Witnesses:

Inventor
Heinrich Severin
By James L. Norris
Atty

H. SEVERIN.
APPARATUS FOR MANUFACTURING HOLLOW GLASS ARTICLES, SUCH AS BOTTLES.
APPLICATION FILED MAR. 28, 1907.

901,199.

Patented Oct. 13, 1908.

2 SHEETS—SHEET 2.

Witnesses,

Inventor
Heinrich Severin
By
James L. Norris
Atty.

UNITED STATES PATENT OFFICE.

HEINRICH SEVERIN, OF ACHERN, GERMANY.

APPARATUS FOR MANUFACTURING HOLLOW GLASS ARTICLES, SUCH AS BOTTLES.

No. 901,199.  Specification of Letters Patent.  Patented Oct. 13, 1908.

Application filed March 22, 1907. Serial No. 365,168.

*To all whom it may concern:*

Be it known that I, HEINRICH SEVERIN, engineer, of Achern, in the Grand Duchy of Baden, in the German Empire, have invented new and useful Improvements in Apparatus for the Manufacture of Hollow Glass Articles, Such as Bottles, of which the following is a specification.

The present invention relates to an apparatus for the manufacture of hollow glass articles, such as bottles, and has for its object to essentially simplify the said manufacture.

It refers to that class of apparatus which consists of an intermediate receiver arranged in the glass furnace or a chamber thereof and from which the molten glass is pressed into a receiving mold or the like placed with its open lower end upon an outlet of the receiver.

According to the present invention, the intermediate receiver is arranged in the glass furnace or the chamber thereof in such a manner that the mouth of the glass outlet of the receiver is inside the heated furnace which latter for this purpose is provided with a suitable opening for the introduction of the receiving mold to the outlet channel of the receiver. That part of the receiver surrounding the mouth of the outlet channel for the glass has such a shape i. e. sloping walls, that the glass falling out of or off from the receiving mold automatically is fed back to the furnace, so that it can only enter again the intermediate receiver in a thoroughly molten state.

The receiving mold carries a knife which is arranged so as to be swung around the lower open end of the former and which is provided with a hole through which the glass is pressed from the outlet channel of the intermediate receiver to the receiving mold. The said knife sits down on the mouth of the outlet channel of the intermediate receiver when the receiving mold is lowered for being filled, and thereby prevents a direct contact between the walls of outlet channel of the receiver and the mold so that the disadvantage of the glass clogging to the receiving mold is avoided.

Figure 1:
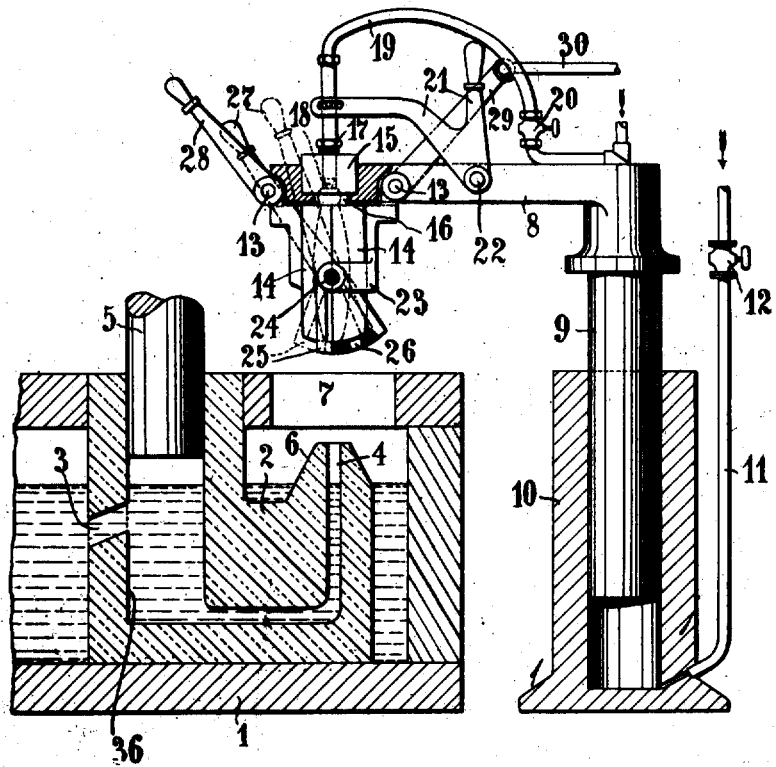
Figure 2:
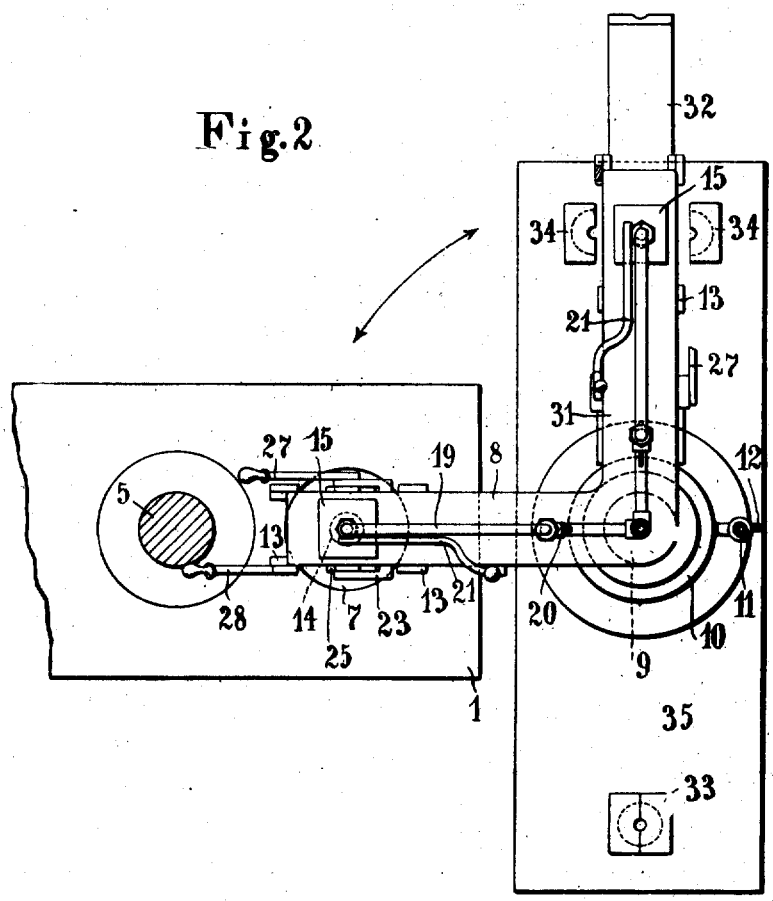
Figure 3:
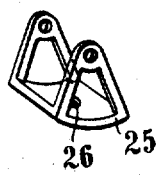

The apparatus is shown on the accompanying drawings in which represent: Figure 1 a vertical sectional view of a part of the melting furnace and of a machine for manufacturing hollow glass articles. Fig. 2 a plan view of a modified form of the machine. Fig. 3 a perspective view of the knife for cutting off the superfluous glass and for closing the receiving mold.

In the furnace 1 or a chamber thereof an intermediate receiver or hollow block 2 of fireproof material is arranged as is clearly shown on the drawing in such a manner that the opening of the outlet channel 4 is wholly heated by the furnace gases so that the glass must leave the block 2 and enter the receiving mold in a perfectly liquid state and cannot harden or freeze when being delivered to the receiving mold. The block is provided with an inlet 3 for the molten glass, a cylindrical space 36 for receiving a piston or plunger 5 and the channel 4 already referred to through which the glass is pressed by means of the piston or plunger 5 into the receiving mold 14 placed on the mouth of the channel 4. That part of the block 2 which surrounds the mouth of the channel 4 is provided with sloping walls so that the glass cut off by the knife from the receiving mold and being more or less hardened or frozen slides down on the said walls and is fed back to the furnace where it is thoroughly melted before it again enters the intermediate receiver. The upper wall of the furnace or chamber above the channel 4 is provided with an opening 7 for introducing the receiving mold and lowering it upon the channel 4. Said opening is advantageously closed by a suitable plate of chamotte or the like (not shown) when the receiving mold is raised above the upper wall of the furnace.

Opposite the opening 7 of the furnace the machine serving for the manufacturing of the glass articles is arranged in such a manner that its receiving mold 14 may be swung over the opening 7 and then lowered upon the mouth of the channel 4 of the intermediate receiver. The machine consists of a vertical shaft 9 which allows of being turned in the foot 10 and also of being lowered and raised and which carries on its top part an arm 8. The pipe 11 provided with a cock 12 serves for passing compressed air to the hollow space of the foot 10 and for raising thereby the shaft 9. By passing off the pressure medium the shaft 9 is lowered. To the free end of the arm 8 pins 13 are fixed on which the two halves of the receiving mold 14 are turnably fastened. The carrier 15 has arranged at its underside the neck mold 16 in such a manner as to be easily exchanged. In the stuffing box 17 of the neck mold carrier 15 the mandrel 18 for forming the neck part of the bottle is guided which mandrel is made hollow and connected with a tubing 19 and valve 20 for the admission of compressed air. On a pin 22 of the arm 8 a double armed lever 21 is turnably fastened, one arm of which serves for turning the lever and the other arm of which engages the neck mandrel 18 by means of a slot and pin connection. This lever serves for raising and lowering the mandrel.

On lugs 23 fastened to the receiving mold 14 pins 24 are arranged upon which a segmental knife 25 is mounted in such a manner as to be swung around the lower end of the receiving mold and to close or open the opening thereof and to cut off the superfluous glass after the mold has been filled. The knife 25 is provided with an opening 26 for allowing the glass to pass from the channel 4 to the receiving mold. Fixed to the knife is a hand lever 27 by means of which the former can be swung into the required positions. The halves of the receiving mold are opened by means of the levers 28 and 29. As shown on the drawing the lever 28 is formed as a hand lever, whereas the lever 29 (by way of example) may be connected by means of the rod 30 to an eccentric (not shown) keyed on the shaft of the motor so that the levers may be actuated and the halves of the receiving mold be opened or closed either by hand or automatically from the main shaft of the machine.

The manufacture of the glass articles is carried out as follows:—The arm 8 having been swung into the position shown in Fig. 1 the lower opening of the receiving mold 14 therefore being over the mouth of the channel 4 of the intermediate receiver or block 2 and the knife 25 having been swung so that its opening 26 is directly under the opening of the receiving mold and above the mouth of the outlet channel 4, the shaft 9 and therewith the receiving mold 14 are lowered, until the latter by means of the knife sits down upon the mouth of the channel 4. By lowering the piston or plunger 5 liquid glass is pressed into the receiving mold which is then raised a little so that the knife 25 can be swung in order to cut off the glass and to close the bottom end of the receiving mold. Instead of by a piston or plunger the glass may be pressed into the receiving mold by other means i. e. by compressed air. The glass cut off falls down and slides upon the sloping walls 6 surrounding the mouth of the channel 4 back into the furnace where it is melted again. The receiving mold is then completely raised, the mandrel 18 which has meanwhile formed the neck in the well known manner is lifted and the arm 8 is so swung as to bring the receiving mold over the finishing mold 33. The knife 25 is then turned in order to open the bottom of the receiving mold. The blank which meanwhile has been blown by introducing compressed air into the receiving mold is now lowered and hung into the finishing mold and finished there by the further introduction of air and if required by turning the blank.

The filled receiving mold having been raised out of the furnace, it is advantageous to continue for a short time pressing the glass out of the channel 4, in order to clear the mouth of the latter from glass that might have fallen down in a more or less solid state when withdrawing the receiving mold. The piston or plunger 5 then returns into its original position, in order to allow fresh molten glass to flow through the opening 3 into the hollow space 36 of the block 2. After each filling of the receiving mold therefore, as is obvious, well molten and heated glass enters the block or intermediate receiver 2.

Referring to Fig. 2, instead of one finishing mold two of them and correspondingly two receiving molds may be used. For this purpose a second arm 31 carrying the receiving mold 32 is fastened to the shaft 9. On a table 35 carried by the foot 10 of the machine, corresponding to the two receiving molds 14 and 32 two finishing molds 33 and 34 are arranged. Thereby the result is obtained that the receiving mold 14 may be filled with fresh glass and simultaneously the bulb previously formed in the receiving mold 32 may be blown out or finished in the finishing mold 34 or 33. Thereby the advantage is obtained that two different kinds of bottles or glass articles and of varying size and shape can be manufactured by means of the same machine.

Having thus described the nature of my said invention and in what manner the same is to be performed, I declare that what I claim is:

1. In an apparatus of the character described, a furnace, a receiver mounted therein, a table, a casing, a piston in said casing, a plurality of arms carried by said piston, molds on said arms, a corresponding number of finishing molds on said table, means for forcing the molten glass out of said receiver into the molds, and means for rotating and vertically adjusting said piston with respect to the receiver and finishing molds.

2. In an apparatus of the character described, the combination of a furnace, a receiver in said furnace, said receiver having an inlet and an outlet within said furnace, means surrounding the outlet for preventing backflow of the molten glass into the receiver, molding means adapted to be moved to and from said outlet, and means for forcing the molten glass out of the receiver into the molds.

3. In an apparatus of the character described, the combination of a furnace, a receiver in said furnace, said receiver having an inlet and an outlet, a conical wall surrounding said outlet, molding means adapted to be moved to and from said outlet, and means for forcing the molten glass out of the receiver into the molds.

4. In an apparatus of the character described, the combination with a furnace having a receiver therein, said receiver having an inlet and an outlet within said furnace, of a plurality of vertically adjustable and rotatively mounted molds in operative relation to said receiver, said molds comprising pivotally mounted sections, means for opening and closing said sections, and a piston for forcing the molten glass out of the receiver into the molds.

5. In an apparatus of the character described, the combination of a furnace, a receiver therein, said receiver having an inlet and outlet within said furnace, a plurality of vertically adjustable and rotatively mounted molds in operative relation to said receiver, said molds comprising pivotally mounted sections, one independently of the other, means for opening and closing said sections, and means for forcing the molten glass out of the receiver into the mold.

6. In an apparatus of the character described, the combination with a furnace having a receiver therein, said receiver having an inlet and an outlet within said furnace, of a plurality of vertically adjustable and rotatively mounted molds in operative relation to said outlet, said molds comprising pivotally mounted sections, one independently of the other, a cutoff device for said molds, means for opening and closing said sections, and means for forcing the molten glass out of the receiver into the molds.

7. The combination with a furnace, of a receiver therein, said receiver having an inlet and an outlet within said furnace, a plurality of vertically adjustable and rotatively mounted molds in operative relation to said receiver, a neck mold connected to each of said molds, a carrier for said neck molds, a mandrel, means for supplying compressed air to said mandrel, and means for forcing the molten glass out of said receiver into the molds.

8. The combination of a furnace, of a receiver therein, said receiver having an inlet and outlet within said furnace, a plurality of vertically adjustable and rotatively mounted molds in operative relation to said receiver, a neck mold connected to each of said molds, a carrier for said neck mold, a mandrel, means for raising and lowering said mandrel, means for supplying compressed air to said mandrel, and means for forcing the molten glass out of said receiver into the mold.

9. In an apparatus of the character described, the combination of a furnace, a receiver in said furnace, said receiver having an outlet and an inlet within said furnace, a slanting wall surrounding said outlet, molding means adapted to be moved to and from said outlet, and means for forcing the molten glass out of the receiver into the mold.

10. In an apparatus of the character described, the combination of a furnace, a receiver mounted therein, said receiver having an inlet and outlet within said furnace, molding means adapted to be moved to and from said receiver, a receiving mold, a knife provided with an opening for allowing the glass to enter the receiving mold and adapted to swing around the lower end of said receiving mold and bearing against the mouth of the outlet of the receiver and thus prevent contact between the receiving mold and the wall of said outlet and simultaneously cut off the superfluous glass, and means for forcing the molten glass out of the receiver into the molding means.

In testimony whereof I have hereunto set my hand in presence of two subscribing witnesses.

HEINRICH SEVERIN.

Witnesses:
Dr. Pax,
Susi Pax.